Aug. 14, 1951     E. RIMAILHO     2,564,311
RAILWAY VEHICLE DECOMPOSABLE INTO
TWO VEHICLES FIT FOR ROAD-RUNNING
Filed Aug. 27, 1946     4 Sheets-Sheet 2
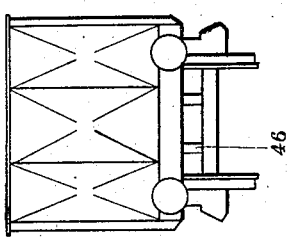
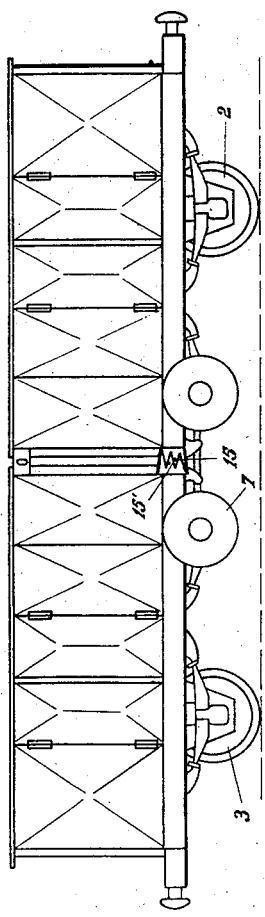
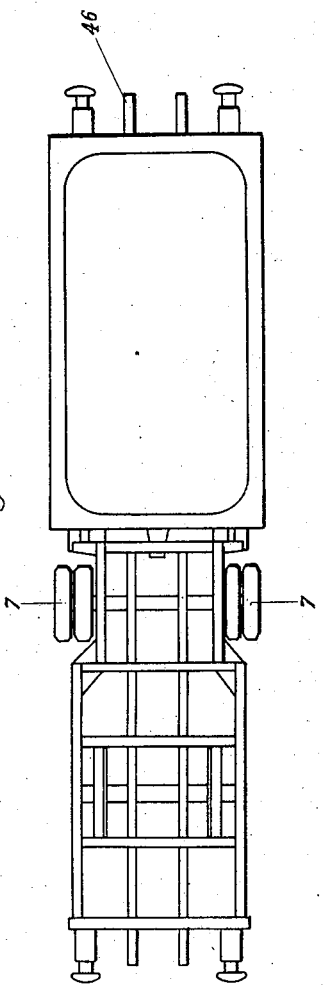
INVENTOR
Emile Rimailho
BY
ATTORNEY Aug. 14, 1951     E. RIMAILHO     2,564,311
RAILWAY VEHICLE DECOMPOSABLE INTO
TWO VEHICLES FIT FOR ROAD-RUNNING Filed Aug. 27, 1946     4 Sheets-Sheet 3

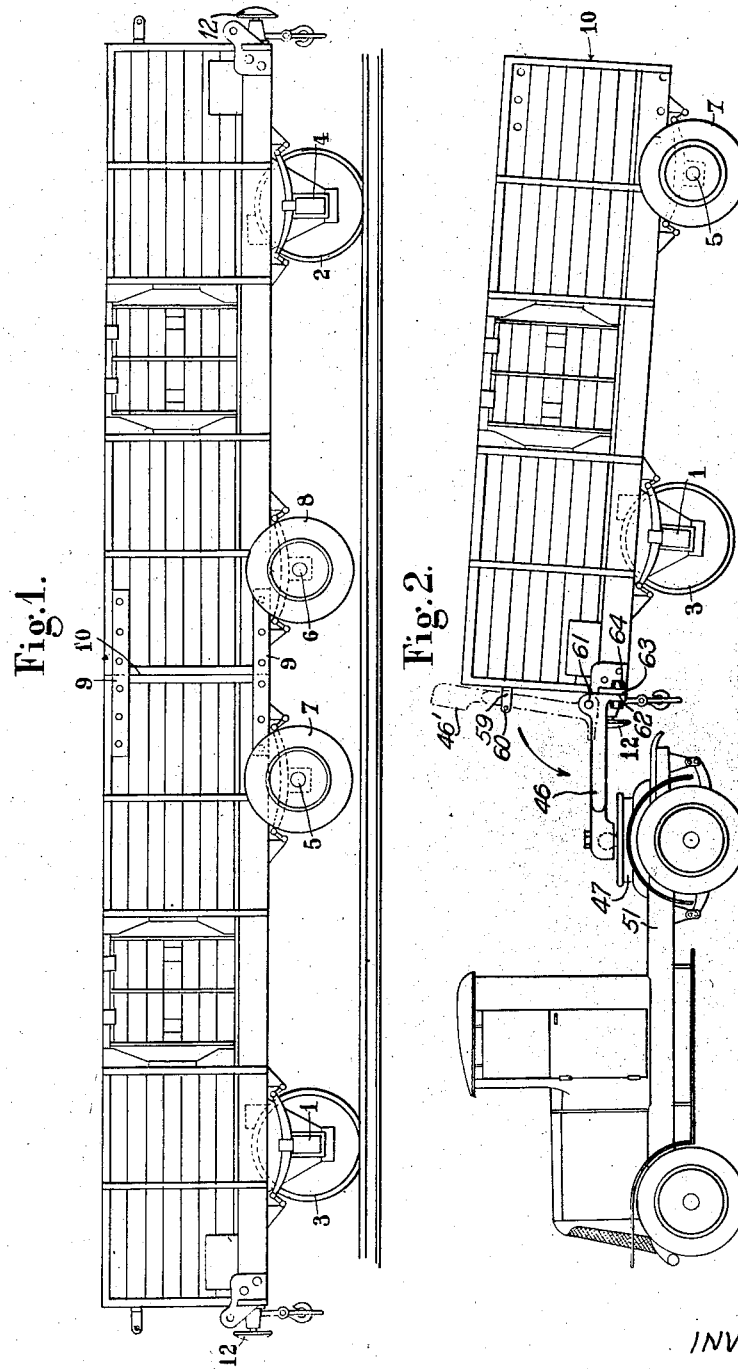

Inventor
Emile Rimailho
By Robert E. Burns
Attorney

Aug. 14, 1951 E. RIMAILHO 2,564,311
RAILWAY VEHICLE DECOMPOSABLE INTO
TWO VEHICLES FIT FOR ROAD-RUNNING
Filed Aug. 27, 1946 4 Sheets-Sheet 4
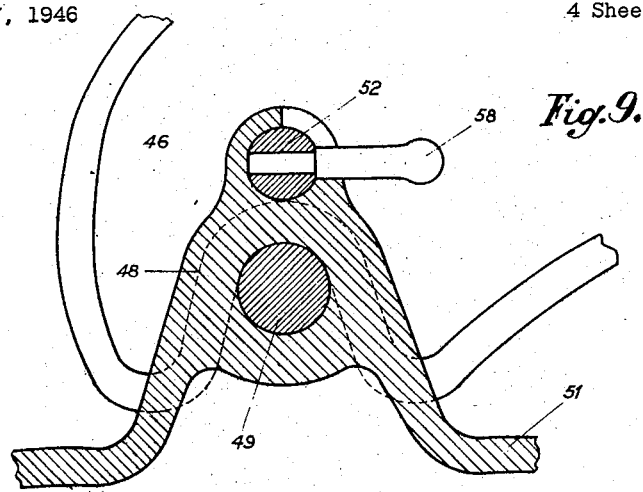
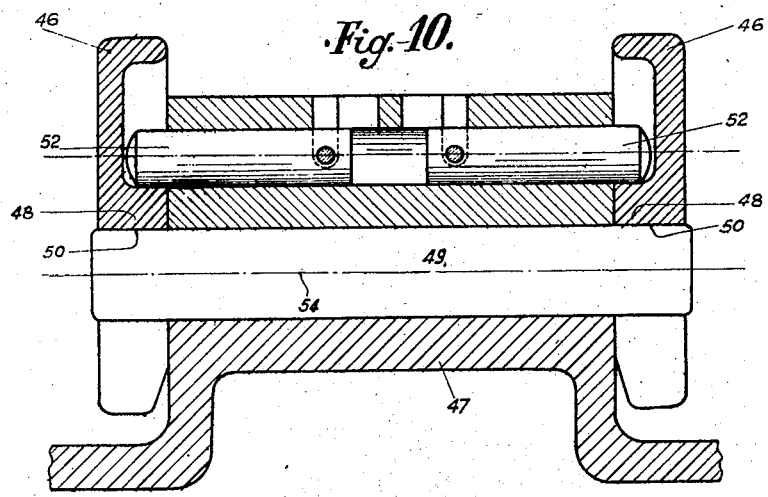
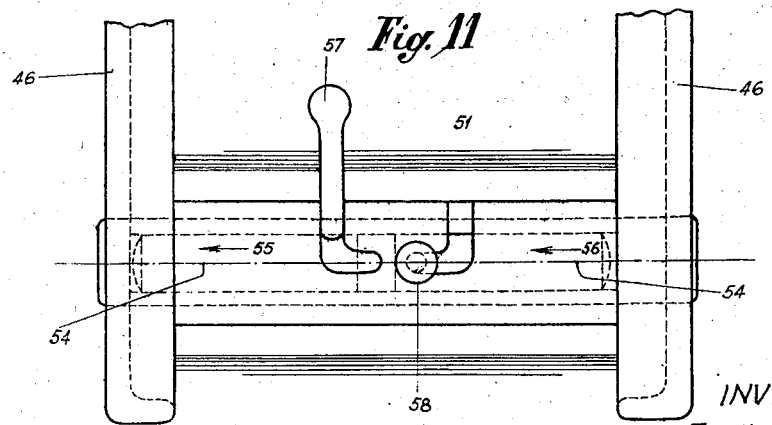
INVENTOR
Emile Rimailho
BY
*Robert E Burns*
ATTORNEY Patented Aug. 14, 1951

2,564,311

UNITED STATES PATENT OFFICE 2,564,311

RAILWAY VEHICLE DECOMPOSABLE INTO TWO VEHICLES FIT FOR ROAD RUNNING

Emile Rimailho, Pont-Errembourg, France

Application August 27, 1946, Serial No. 693,257
In France April 14, 1945

Section 1, Public Law 690, August 8, 1946
Patent expires April 14, 1965

3 Claims. (Cl. 105—215)

This invention aims at providing a railway vehicle which can be separated into two single axle trailers fit for road traffic.

The car is equipped with four pairs of wheels, of which only those at the ends of the car are provided with flanges. The pairs of wheels on the intermediate axles can either be lifted clear from the track, in which case the whole load is carried by the two end axles, or may have such broad treads that they will remain on the rails even in the negotiation of curves.

The wheels for road-running are of the type comprising individual brake drums, whereas the end wheels are equipped with the conventional railway brake gear.

Secured at either end of the intermediate axles are flangeless preferably twin wheels whose treads are designed for road-running, said wheels being equipped with steel or solid rubber treads. If desired they may be equipped with tyres, or with a spring hub, or with treads carried by internal balanced springs.

These particular arrangements are combined with the provision of a car underframe made up of two halves rigidly assembled at the center of the complete assembly into one single underframe. With such an arrangement it becomes possible, by disconnecting the underframe halves from each other together with the shock-absorbing means, the pulling and the braking gears at the middle of the whole structure, to form two separate vehicles. Each separate vehicle is equipped at one end thereof, in addition to the conventional drawgear and buffer gear, with a coupling gear whereby each car half can be coupled as a two-wheeled trailer with a rod tractor. Said coupling gear, having its pivot on a coupling head at the rear of the tractor, may be integral with the car underframe and thus provide an extension of the same, or it may be hinged thereto and dropped to coupling position, when it similarly provides a rigid extension of the car half underframe, or it may simply be a portion of said underframe, to be seated on top of the rear of the tractor.

When separated, each of the vehicles thus formed is held up at its end remote from the buffers by a jack, after which it is lowered to bring the road-running wheels into contact with the ground. It thus temporarily provides a two-axled vehicle, since the wheels at the buffer end thereof are resting on the road with their flanges and those at the opposite end, which are provided each with a single road-running tread, or with a pair of them, as desired, arranged at either side of a rail-running tread, which also rests on the ground.

When the four-wheeled road tractor has been driven backwards into close relation with the buffer end of the car half and the latter lifted at said end and sealed upon the coupling head at the rear of the tractor, the flanged wheels are no longer in engagement with the ground, and that portion of the car half load which heretofore was carried by said wheels is transferred to the rear axle of the tractor. The car half is then coupled as a single axle trailer ready to proceed with home delivery as a complement to rail transportation.

Reverse operations of laying down, re-setting on rails and re-assembly of the two single axle trailers into one single rigid railway vehicle underframe enables conversion directly from road to rail traffic, the car being in condition to be incorporated in a train.

The invention also covers various features in the design of such a vehicle, and notably:

(a) the means for assembling the underframe halves providing the complete vehicle;

(b) the means for lifting the wheels on the road-running axles for rail running, and for locking them in lowered position for road running;

(c) The means for coupling the trailer with the tractor.

These various features are illustrated in the appended drawing.

Figure 1 is a diagrammatical view of the vehicle according to the invention as assembled for rail running.

Figure 2 is a similar view showing the same vehicle as divided for road-running.

Figure 3 is an elevational view of a particular embodiment of the vehicle.

Figure 4 is the corresponding top plan view.

Figure 5 is the corresponding end view.

Figures 9 to 11 illustrate details of means for coupling a car half with a tractor.

Figure 6:
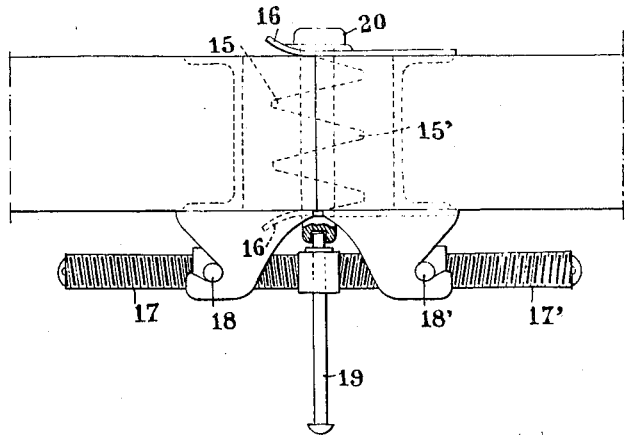
Figures 6 to 8 show details of the means for uniting the two halves of the car according to Figure 3.

In addition to the usual end axles 1 and 4 that carry flanged wheels 2 and 3 the car is equipped close to the middle with a pair of intermediate axles 5, 6 that carry flangeless wheels 7 and 8, at either side of which treads are secured, normally out of engagement with the rail.

The car can be separated into two portions midway of said axles at 10 so as to constitute two underframe halves that can be re-assembled by any suitable means, e. g., by making a fished joint of the side sills as shown at 9 or otherwise by the joggling of stanchions mating into each other and clamped together.

When it is desired to take the car out of the track it is only necessary to hold up the middle portions thereof by means of jacks and to fasten the axles 1 and 4 with the underframe by means of chains or otherwise so that they shall not be sagged by the springs at the lifting of that end of the car, whereafter the wheels 7 and 8 are laid down on the ground. The operation is facilitated where the jacks are supported by a sleeper mounted on rolls running on the rails and enabling the car halves to be moved away from each other. The said wheels 7 and 8 are laid down easily if the load is acted on close to its centre of gravity, in which case the transfer of the same from one axle to the other is effected merely by tilting. At its buffer end the car half is provided with an arm which, for rail running, is lifted to the position shown at 46' in which it is retained in a fork 59 by a bolt 60. Upon removal of the bolt 60 the arm can be lowered about its knuckle pin 61 to the horizontal position shown at 46 and locked on a coupling head 47 provided at the rear end of a tractor. In the said lowered position 46 of the arm it is made fast with the underframe by means of a bolt 64 projecting through a lug 62 of said arm and a rest 63 on the said underframe. With the car half thus coupled the rail-running wheels 3 are clear of the ground and said car half is now resting on its road-running wheels 7.

The two single-axle trailers constituting the car can be reassembled by a reverse operation, to wit, by laying down each one upon the track with its respective wheels 2, 3 whereas the wheels 7 and 8 are clear from the track, whereafter the two underframe halves are mated with each other to reconstitute the complete underframe of the car.

Figs. 3 to 6 illustrate a housing which is provided to accommodate the road-running wheels 7 which may be brought to their lifted position by any known means, e. g. such as described in the U. S. Patent Ser. No. 1,395,144, dated October 25, 1921. In Figs. 3 and 6 the references 15 and 15' designate the joining joggles illustrated in detail in Figs. 6, 7, and 8. Figs. 9, 10, and 11 show a pair of coupling arms which may pertain to the car half according to the invention or to any other trailer, whereby same can be connected with the horizontal pin provided on top of the coupling head at the rear of the tractor.

Figure 7:
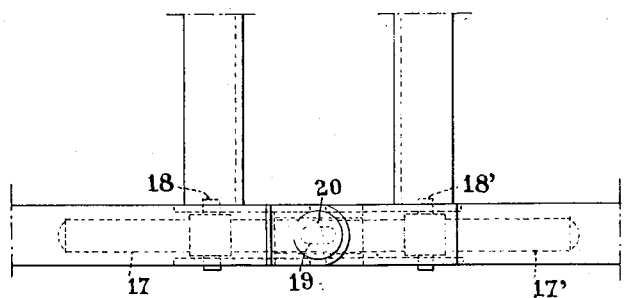
Figure 8:
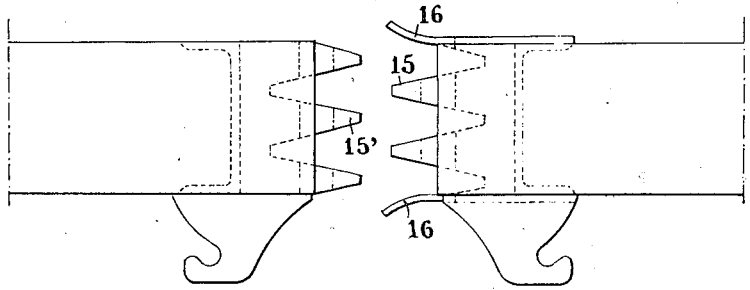

The splicing of the car halves to each other as shown diagrammatically at 9 in Fig. 1 may advantageously be replaced by the arrangement illustrated in Figs. 6 to 8. In this modification the joggles 15, 15' are formed with wedges adapted to tail into one another as the car halves are mated together on the railroad.

The device for assembling the two half-underframes by bolted frame members 9, diagrammatically shown in Fig. 1, can profitably be replaced by that defined in Figs. 3 and 6 to 8. In this variant, the frame-members with lugs at their ends in sawtooth form 15, 15' fit into each other when the two half-trailers are brought together on rails. As shown in these figures, these teeth only need to be cut in the middle regions of the ends in question so that the surfaces of the teeth are hidden and completely protected when the two ends are telescoped with each other. On one of the ends, the two outside edges of the teeth directed towards the interior are prolonged by two guides 16. Each of these two edges has a hook-shaped appendage which engages the spindles held by one of the two nuts 18 and 18'. These two nuts 18 and 18' are screwed respectively on the two ends 17, 17' of a rod with left and right threads, whose central part is traversed by a sliding crank 19. The rotation of this crank acts on the hooks by the intermediary of the spindles, the nuts bring the two ends 15, 15' together, tightly clenching the teeth lodged in each other. When the assembly is thus carried out, it is reinforced by the insertion of a key 20 in the corresponding passages traversing the teeth of the two ends. The lower part of this key is provided with a one-eyed hole which fits over the upper end of the sliding crank 19, thus locking the rotation of the rod with left and right threaded ends 17, 17'.

Figures 10, 11 and 12 show the jacking operation which simplifies the coupling by the provision on the single-axle trailer, as shown herein or otherwise, of a pair of coupling arms 46, formed with hornblock-like ends 48 adapted, as the car half is jacked down, to straddle either projecting end 50 of a horizontal pin 49 having its middle portion rigid with a coupling head 47 pivoted on a turret rigid with the rear portion of the tractor 51. The arms 46 are locked to the coupling head by means of a pair of cylindrical bolts 52 guided in a transverse bore in a boss formed on top of the coupling head and adapted to engage with arcuate grooves provided in the inside of either hornblock 48, which grooves, in the coupled condition of the trailer, are concentric with the axis 54 of the horizontal pin 49 on the tractor. The bolts 52 can be shifted in either direction shown by the arrows 55 and 56 with the aid of levers 57, 58 of which the former is shown in locking position and the latter in unlocked position in Fig. 9.

The object of the combined arrangements intended for an easy performance of the separation and the re-uniting of the pair of car halves into a complete car will now be described briefly in connection with the two following cases:

(a) a single car is to be landed at some unequipped point in the railway system;

(b) a complete train of composite cars is to be removed or re-formed rapidly at an equipped junction yard.

In the first instance the trailers are stopped in the axis of the track, the latter being provided with guard rails for an easier driving of the tractors.

The vehicles driven forward in opposite directions are stopped at a certain distance from each other. Each car half is provided at its four corners with props mounted on small flanged wheels carrying jacks operated preferably automatically with the aid of the engine on the tractor. The car half is jacked up on said small wheels to facilitate moving them toward each other and re-uniting them into one complete car.

In the case of a complete train an equipment at the junction point with the railway system may consist of a turntable or a cross bridge, or more simply two side channels with inclines. such an equipment makes its easier to rapidly deal with the stock. By considering Figs. 3 and 6 it will be seen that due to the position of the twin wheels right above the side channels they can be dropped easily, whereafter the car halves can be separated and then coupled with the tractor, the road-running wheels running up the inclines as they come out of the channels.

For an easier coupling the coupling arms 46 are either retractable or pivoted to the end sill on axes parallel with the axle so that they can be swung down into engagement with the fulcrum pin 49. Once the coupled tractor has been advanced up to the platform the trailer occupies the position shown in Fig. 2.

I claim:

1. A car for running on a railroad, which car can be separated into two semi-trailers for running on a highway by coupling each semi-trailer to a tractor, said car presenting a transverse plane of symmetry and comprising a rigid underframe, two pairs of flanged wheels for running on a railroad fitted under the underframe, one pair at each end thereof, a buffer and hauling system for running on a railroad mounted on the end adjacent each set of flanged wheels and a vertical wall fitted at each end of the underframe, said car comprising a rigid assembly of two distinct and identical elements each having a vertical wall at the end opposite the flanged wheels, the two vertical walls of the two elements being rigidly coupled together at the plane of symmetry of the car, a coupling system for road haulage fitted to the end opposite the end with flanged wheels, said coupling system for hauling on the highway being hooked against the vertical wall of that end which has flanged wheels and being capable of being turned downward, an axle fitted with two wheels for running on a highway and fitted under the part of the underframe near the transverse plane of symmetry and mounted on the underframe, releasable means for alternately separating or rigidly assembling the two elements forming the car and means on the underframe for lowering or raising the axle with the two wheels for running on a highway.

2. A car for running on a railroad which car can be separated into two semi-trailers for running on a highway by coupling each semi-trailer to a tractor, according to claim 1, in which the means for rigidly assembling the two elements comprises the toothed jaws with saw-teeth section integral to one or the other element, each of these jaws having a hook-shaped extension and two of these jaws being placed opposite one another and overlapping each other when the elements come together, a rod with left and right threads at both ends, two spindle nuts fitted on the left and right threads of the rod and engaging by their spindles in the hook-shaped extensions of the jaws, a crank enabling the rod to be turned to force the two jaws against each other by the action of the spindles of the nuts on the hook-shaped extensions of said jaws.

3. A car for running on a railroad which car can be separated into two semi-trailers for running on a highway by coupling each semi-trailer to a tractor, said car presenting a transverse plane of symmetry and comprising a rigid underframe, two pairs of flanged wheels for running on a railroad fitted under the underframe, one pair at each end thereof, a buffer and hauling system for running on a railroad mounted on the end adjacent each set of flanged wheels and a vertical wall fitted at each end of the underframe, said car comprising a rigid assembly of two distinct and identical elements each having a vertical wall at the end opposite the flanged wheels, the two vertical walls of the two elements being rigidly coupled together at the plane of symmetry of the car, a coupling system for road haulage fitted to the end opposite the end with flanged wheels, said coupling system for hauling on the highway being hooked against the vertical wall of that end which has flanged wheels and being capable of being turned downward, an axle fitted with two wheels for running on a highway and fitted under the part of the underframe near the transverse plane of symmetry and mounted on the underframe, releasable means for alternately separating or rigidly assembling the two elements forming the car and means on the underframe for lowering or raising the axle with the two wheels for running on a highway, said elements constituting the two semi-trailers for running on a highway by coupling to a tractor when they are separated from each other, the coupling system for road hauling of each of said elements having been turned down in front and the axle with the two wheels for running on the highway having been lowered to the ground.

EMILE RIMAILHO.

REFERENCES CITED

The following references are of record in the file of this patent:

UNITED STATES PATENTS

| Number | Name | Date |
|---|---|---|
| 1,543,452 | Seitz | June 23, 1925 |
| 2,018,972 | Pollock et al. | Oct. 29, 1935 |
| 2,043,034 | Dalton | June 2, 1936 |
| 2,043,134 | Wanamaker | June 2, 1936 |

FOREIGN PATENTS

| Number | Country | Date |
|---|---|---|
| 812,945 | France | Feb. 15, 1937 |
| 446,790 | Germany | July 11, 1927 |
| 23,661 | Great Britain | Oct. 24, 1906 |